United States Patent [19]

Watanabe

[11] Patent Number: 5,060,247
[45] Date of Patent: Oct. 22, 1991

[54] FLUORESCENT X-RAY FILM THICKNESS GAUGE

[75] Inventor: Toshio Watanabe, Tokyo, Japan

[73] Assignee: Seiko Instruments, Inc., Tokyo, Japan

[21] Appl. No.: 436,874

[22] Filed: Nov. 15, 1989

[30] Foreign Application Priority Data

Nov. 17, 1988 [JP] Japan .................. 63-150103[U]

[51] Int. Cl.$^5$ .................................... G01N 23/223
[52] U.S. Cl. ................................ 378/50; 378/46; 378/54; 378/149; 378/148
[58] Field of Search .............. 378/50, 46, 49, 54, 378/151, 148, 149

[56] References Cited

U.S. PATENT DOCUMENTS 4,928,293  5/1990  Behncke ................. 378/050

FOREIGN PATENT DOCUMENTS 2121168 12/1983 United Kingdom .
2210161  6/1989 United Kingdom ............. 378/50

Primary Examiner—Edward P. Westin
Assistant Examiner—Don Wong
Attorney, Agent, or Firm—Spensley, Horn, Jubas & Lubitz

[57] ABSTRACT

A fluorescent X-ray film thickness gauge having an X-ray source for generating incident X-rays, a shutter device for shuttering the incident X-rays, a collimator for collimating the incident X-rays, a sample stage for mounting a sample onto which the collimated X-ray is irradiated, and a detector for detecting fluorescent X-rays generated from the sample upon irradiation of the collimated X-rays. The shutter device includes a switching mechanism operable to switch the shutter device between a measurement state and a calibration state, a shutter frame, and a shutter member disposed in the shutter frame and having a measurement passage, a calibration passage and a calibration plate in the calibration passage. The shutter member is selectively settable by the switching mechanism in the measurement state such that the measurement passage is positioned to transmit therethrough the incident X-rays to direct the same to the sample to effect measurement of a film thickness of the sample and in the calibration state such that the calibration passage is positioned to transmit therethrough the incident X-rays to direct the same to the calibration plate so that fluorescent X-rays are emitted from the calibration plate into the detector to thereby effect calibration of the gauge.

5 Claims, 1 Drawing Sheet

FLUORESCENT X-RAY FILM THICKNESS GAUGE

BACKGROUND OF THE INVENTION

The present invention relates to a fluorescent X-ray film thickness gauge, and more specifically relates to a shutter device thereof.

The conventional shutter device of a fluorescent X-ray film thickness gauge is constructed so as to simply open and close an X-ray path to selectively pass or block the X-ray directed through a collimator to a sample stage. Such shutter device is not associated with calibration of the gauge.

Consequently, periodic calibration of the gauge has to be carried out in the prior art. Further, calibration of the gauge requires complicated steps such as setting of a calibration plate on a sample stage and positional adjustment of the calibration plate on the sample stage.

SUMMARY OF THE INVENTION

An object of the present invention, therefore, is to enable an automatic calibration setting to thereby eliminate the drawbacks of the prior art.

The above and other objects are achieved, according to the present invention, by a fluorescent X-ray film thickness gauge. The gauge is composed of an X-ray source for generating X-rays, a sample stage for holding a sample which is to be irradiated by the X-rays, a detector for detecting fluorescent X-rays generated from the sample, a shutter device interposed between the X-ray source and the sample stage, and a collimator. The shutter device is composed of a shutter body and a switching mechanism for switching a shutter provided in the shutter body between a film thickness measurement state and a film thickness non-measurement state. The shutter is provided with a calibration plate, a measurement passage settable in the film thickness measurement state to direct the X-rays to the collimator and a calibration passage settable in the film thickness non-measurement state to direct X-rays to the calibration plate. Fluorescent X-rays are secondary X-rays emitted from a sample which is irradiated with primary X-rays or an electron beam.

In operation, firstly, the switching mechanism is operated to switch the shutter into the film thickness non-measurement state. In this state, the calibration passage is set in a position effective to transmit the incident X-rays. Thus, the X-rays pass through this passage to irradiate the calibration plate. Then, fluorescent X-rays are generated from the calibration plate and pass to a detector through a calibration detection window to thereby provide calibration information. In this state, passage of the X-rays to the collimator is blocked.

Next, when the switching mechanism is operated to select the film thickness measurement state, the shutter is displaced to set the measurement passage in a position effective to transmit the incident X-rays. Therefore, the X-rays are transmitted through this passage and the collimator and irradiate a sample on the sample stage so that fluorescent X-rays are generated from the sample. The fluorescent X-rays reach the detector through a measurement window to thereby provide film thickness information of the sample.

DESCRIPTION OF THE PREFERRED EMBODIMENTS

Figure 1:
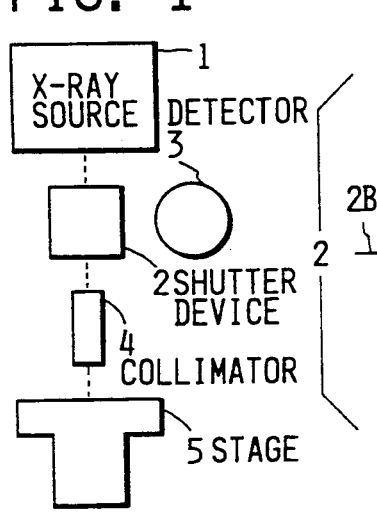
FIG. 1 is a schematic diagram showing the basic parts of a fluorescent X-ray film thickness gauge according to the present invention.

As shown in FIG. 1, a gauge according to the invention includes an X-ray source 1, a shutter device 2, a detector 3, a collimator 4 and a sample stage 5.

Figure 2A:
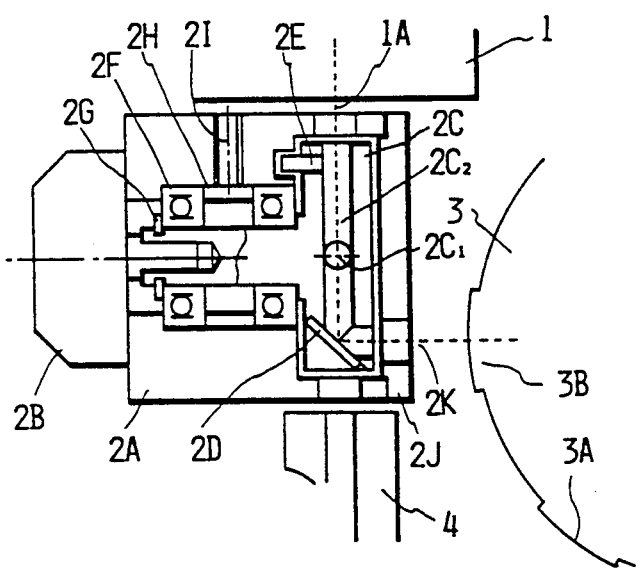
FIG. 2A is a cross-sectional view of an embodiment of a shutter device, which is an essential part of the present invention, taken along an X-ray axis to illustrate the film thickness non-measurement state.
Figure 2B:
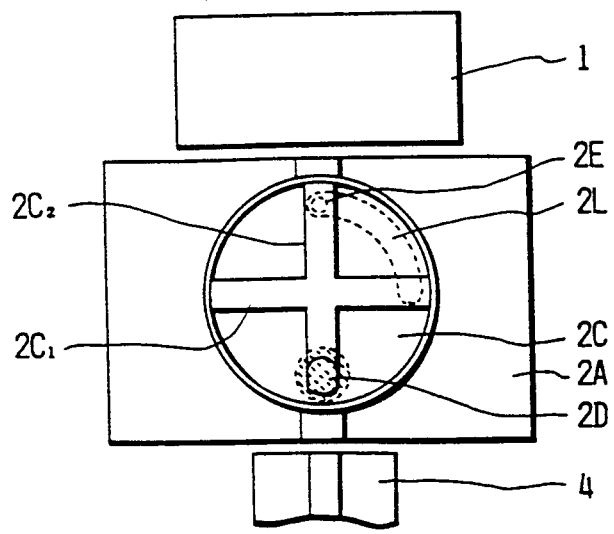
FIG. 2B is a sectional view of the shutter device taken along the X-ray axis and perpendicular to the plane of FIG. 2A.

Referring to FIGS. 2A and 2B, shutter device 2 is composed of a shutter frame or body 2A which is disposed in the path of the X-ray beam 1A, a switching mechanism in the form of a rotary actuator 2B which is angularly displaceable around a rotation axis $2B_1$, and a shutter member 2C disposed in shutter body 2A and connected to rotary actuator 2B. Shutter member 2C has a measurement passage $2C_1$ and a calibration passage $2C_2$, which passages intersect one another. Shutter device 2 further has a calibration plate 2D disposed in and extending across the entirety of, calibration passage $2C_2$, a stopper 2E, a bearing 2F supporting shutter member 2C for rotational member, a stop ring 2G holding bearing 2F in place on a stationary support, a bearing support 2H, a fixing screw 2I, a cover 2J for covering shutter body 2A to prevent leakage of X-rays, and a groove 2L formed in shutter body 2A.

Detector 3 is disposed adjacent to shutter device 2 and has a measurement window 3A oriented to admit fluorescent X-rays emitted by an irradiated sample mounted on stage 5, and a calibration window 3B which can admit fluorescent X-rays traveling along a path 2K from calibration plate 2D. Collimator 4 is disposed downstream of shutter device 2.

Next, the operation of shutter device 2 according to the present invention will be described with reference to FIGS. 2A and 2B which show the film thickness non-measurement state, or calibration state, of the shutter device, as noted earlier.

The X-ray beam 1A from X-ray source 1 is introduced into shutter body 2A, passes along passage $2C_2$ of shutter member 2C, and calibration plate 2D. Fluorescent X-rays generated at calibration plate 2D follow path 2K into calibration window 3B of detector 3 to thereby provide information necessary for calibration of the gauge. In this state, measurement passage $2C_1$ is positioned so that it extends perpendicular to the axis of the incident X-ray beam 1A. Hence the passage of X-rays to the collimator is blocked.

Next, in order to switch to the film thickness measurement state, the rotary actuator 2B is angularly displaced. Accordingly, shutter member 2C, which is mechanically connected to the rotary actuator 2B, is also angularly displaced by 90°. At the same time, stopper 2E fixed to shutter member 2C travels along groove 2L of arc shape formed in shutter body 2A and finally stops against the opposite end of groove 2L so that shutter member 2C stops in place. As a result, measurement passage $2C_1$ formed in shutter member 2C is set in the position effective to pass the incident X-ray beam 1A.

Thus, X-rays can travel along passage $2C_1$ to collimator 4 disposed below shutter body 2A. The collimator 4 determines an irradiation spot area of the X-ray suitable for the measurement of film thickness of the sample. The collimated X-rays irradiate the sample, producing fluorescent X-rays which are admitted to detector 3 via measurement window 3A to effect the film thickness measurement of the sample. In this operating state, calibration passage hole $2C_2$ is set perpendicular to this axis of X-ray beam 1A to block X-rays from calibration plate 2D.

As described above, according to the present invention, X-rays are blocked relative to a sample in the film thickness non-measurement state to enable automatic production of the calibration information of the gauge, thereby eliminating periodic calibration of the gauge which would be carried out in the conventional gauge. Moreover, the inventive gauge can eliminate complicated work such as setting the calibration plate on the sample stage and positional adjustment of the calibration plate on the sample stage, which would be needed in the calibration of the conventional gauge, thereby providing an easily operable fluorescent X-ray film thickness gauge.

This application relates to subject matter disclosed in Japanese Patent Application No. 63-150103, filed on Nov. 17, 1988, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a fluorescent X-ray film thickness gauge having an X-ray source for generating an X-ray beam, a shutter device providing a selectively blockable path for the X-ray beam, a collimator for collimating the X-ray beam, a sample stage for mounting a sample for irradiation by the collimated X-ray beam, and a detector for detecting fluorescent X-rays generated from the sample upon irradiation by the collimated X-ray beam, the improvement wherein said shutter device comprises:

a shutter member formed to provide a measurement passage as a through hole, a calibration passage as a blind hole and a fluorescent X-ray passage opening to said calibration passage as a blind hole directed at an angle with respect to said measurement passage and said calibration passage, said shutter member having a calibration plate disposed in said calibration passage and extending across the entirety of said calibration passage and said shutter member being rotatable about an axis positioned at substantially a right angle with respect to the direction of said X-ray beam between a measurement position and a calibration position, said measurement position being such that the X-ray beam generated by said source travels through said measurement passage to said sample stage and said calibration position being such that the X-ray beam generated by said source travels through said calibration passage to impinge on said calibration plate in order to cause fluorescent X-rays emitted by said calibration plate to be directed to said detector through said fluorescent X-ray passage; and switching means connected to said shutter member for selectively moving said shutter member between said measurement position and said calibration position.

2. A gauge as defined in claim 1 wherein said measurement and calibration passages intersect one another and are angularly offset from one another, and said shutter member is movable in rotation about an axis which passes through the region where said passages intersect one another.

3. A gauge as defined in claim 2 wherein said detector is spaced laterally from the X-ray beam.

4. A gauge as defined in claim 1 wherein said shutter device comprises means for guiding said shutter member over a path having end limits constituting said measurement and calibration positions, respectively.

5. A gauge as defined in claim 2 wherein said calibration plate is located downstream, with respect to the direction of travel of the X-ray beam, of the location wherein said passages intersect one another.

* * * * *